June 15, 1926.  
H. M. ROCKWELL  
1,588,614  
CRANK SHAFT ASSEMBLY FOR ENGINES  
Filed Dec. 23, 1920  2 Sheets-Sheet 1
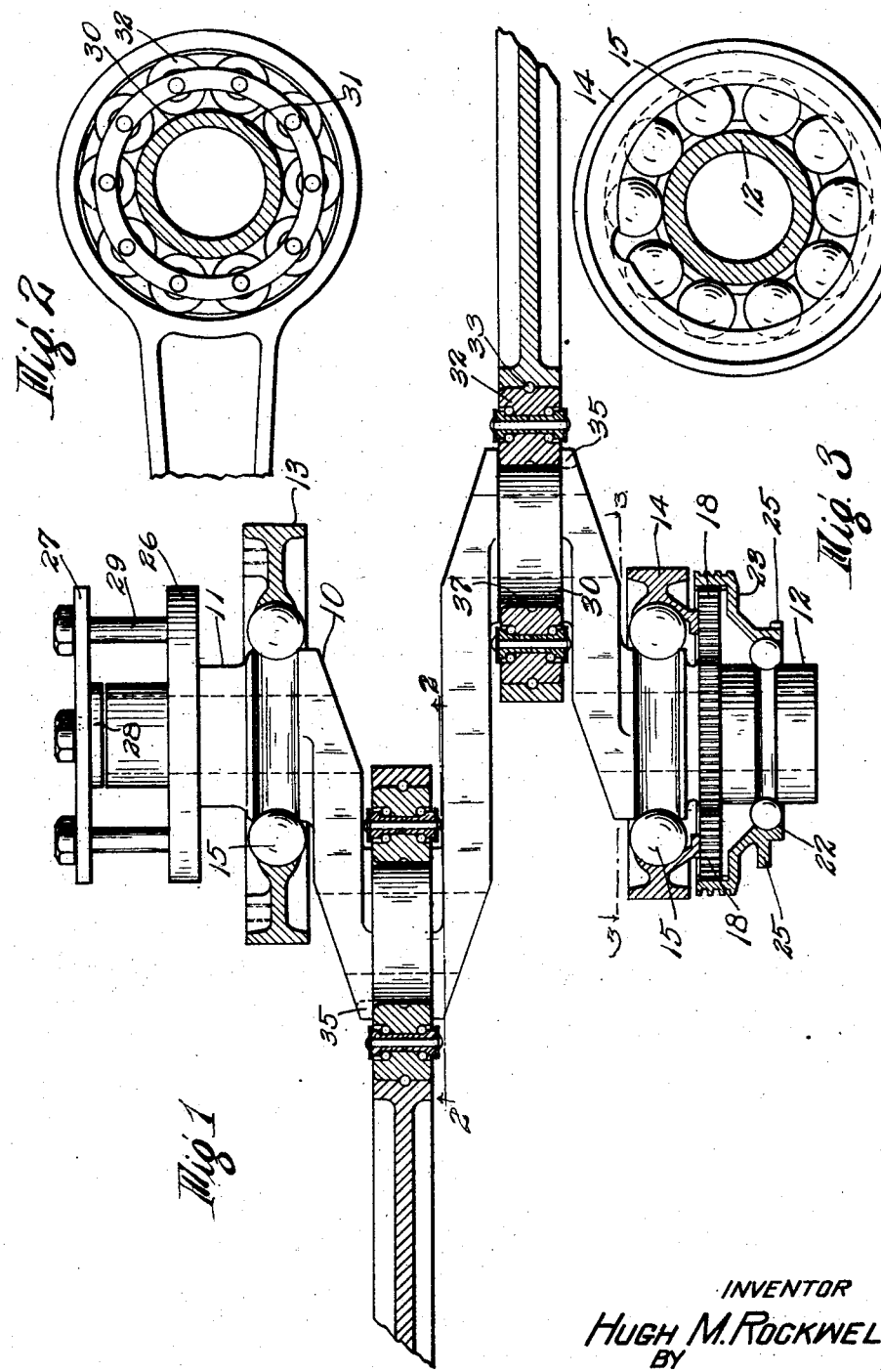
INVENTOR  
HUGH M. ROCKWELL  
BY  
ATTORNEY

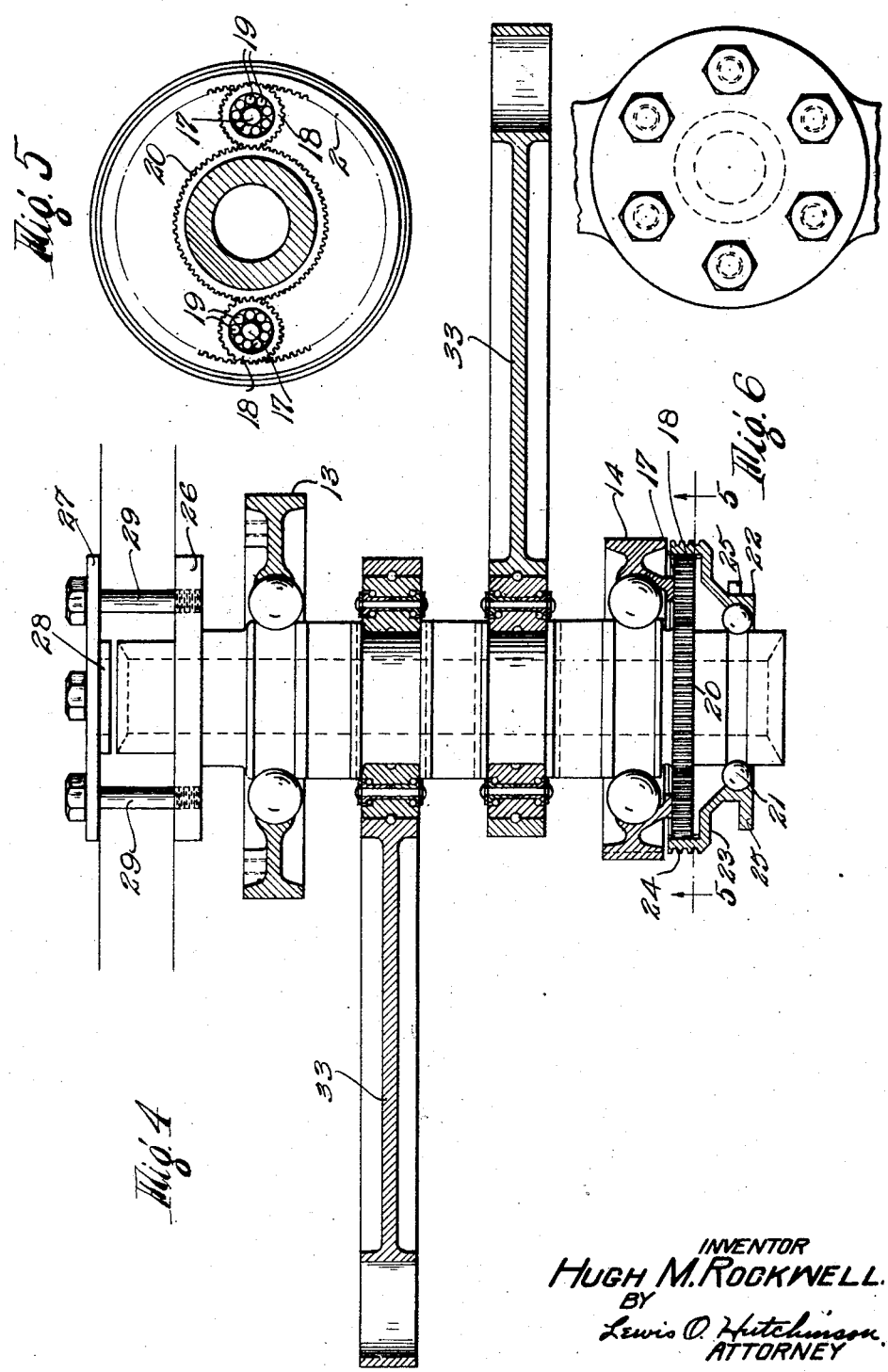

Patented June 15, 1926.

1,588,614

UNITED STATES PATENT OFFICE.

HUGH M. ROCKWELL, OF BRISTOL, CONNECTICUT.

CRANK SHAFT ASSEMBLY FOR ENGINES.

Application filed December 23, 1920. Serial No. 432,705.

This invention relates to prime movers of the internal combustion type and is directed more especially to an improved crank shaft assembly for air-craft engines.

An object of the invention is the provision of a crank shaft assembly in which the shaft together with the main bearings, connecting rods and valve operating cams form a structure which may be handled as a unit in the assembly or disassembly of the engine.

A further object of the invention is the provision of a crank shaft assembly in which the various elements thereof are locked in their assembled relation to each other by means of antifriction elements interposed between the directly coacting elements.

An additional object of the invention is an improved arrangement for attaching the propeller of the air-craft to the crank shaft of the engine.

This invention will be better understood by having reference to the following specification and accompanying drawings wherein Fig. 1 is a plan view partly in section, of the crank shaft assembly, Fig. 2 is a section on the line 2—2 of Fig. 1, Fig. 3 is a section on the line 3—3 of Fig. 1, Fig. 4 is similar to Fig. 1 with the elements in a different position, Fig. 5 is a section on line 5—5 of Fig. 4 and Fig. 6 is a front elevation.

The hollow crank shaft 10 has its forward and rear ends 11 and 12 respectively journalled in the rings 13 and 14. These rings are adapted to be mounted on the walls of a crank shaft casing as disclosed in applicant's copending application Serial No. 400,786, filed August 2, 1920. Each of these rings is provided on its inner periphery with a ball raceway and in each of the ends of the crank shaft is cut a coacting ball raceway. Between the coacting raceways are interposed the antifriction balls 15.

Extending outwardly from the ring 14 are two stud shafts 17 on which are rotatably mounted the pinions 18 by means of the antifriction balls 19 interposed between coacting ball grooves on the shafts and the pinions. On the crank shaft is provided a gear 20 the teeth of which are integral with the shaft and mesh with the teeth of the pinions 18.

A second ball raceway is cut in the end 12 of the crank shaft and receives the antifriction balls 21 which are also arranged in a ball raceway on the inner periphery of a cam carrier 22 which is journalled on the shaft by means of said balls. Extending inwardly from the carrier is an annular shoulder 23 on the inner surface of which are teeth which mesh with the teeth of the pinions 18. On the outer surface of the shoulder is cut a worm gear 24 which may be utilized in connection with a worm wheel to drive an oil pump as disclosed in the aforesaid copending application. The carrier 22 is provided with cams 25 which are adapted to engage and operate valve tappet rods.

On the end 11 of the crank shaft is a flange 26 having bolt holes therethrough. The propeller of the airplane has an aperture into which the end 11 of the crank shaft projects. A circular plate 27, having a pilot 28 adapted to fit into the aperture of the propeller, bears against the propeller to clamp it in place against the flange 26 and is held by means of bolts 29 which pass through it and the propeller and are threaded into the bolt holes on the flange.

The crank pins 30 have grooves 31 cut in their surfaces to receive antifriction rollers 32. Connecting rods 33 having apertures in their inner ends are associated with the crank shaft and have the surfaces of their apertures in contact with the rollers 32. The rollers and the connecting rods are locked against relative axial movement by means of wires 33 seated in the surface of the apertures and engaging grooves in the rollers or in any other suitable manner. This arrangement is described in detail in the aforesaid copending application.

To assemble the crank shaft and its associated elements the following steps are taken. The ring 13 is slipped over the end 12 and is worked along the shaft until it can be arranged concentric with the ball groove near the end 11. The balls 21 are then inserted between the ball grooves on the shaft and ring, thus locking the ring in its assembled relation to the shaft. The connecting rods are then passed over the end 12 and along the crank shaft until the aperture in each one receives a crank pin. The rollers 32 are then introduced through the filing notch 35 between the surfaces of the apertures and the grooves in the crank pins, as disclosed in the aforesaid copending application, locking the connecting rods in their assembled relation with the shaft. Next the ring 14 is passed over the end 12 and the teeth of the pinions 18 engaged with the teeth of the gear 20, after which the balls are introduced. Finally the cam carrier 22 is placed over the end 12 and the teeth of its internal gear are meshed with its teeth of the pinions 18. Again antifriction elements are introduced between the carrier and the shaft into the grooves provided therefor and lock the two elements in their assembled relation. Once these elements are assembled, the whole structure may be handled as a unit and may be introduced directly into the crank case of an engine of the type disclosed in the aforementioned copending application.

In order that the raceways for the various sets of antifriction elements may be formed directly in the members constituting the crank shaft assembly, these members are formed of a material which may be hardened and ground. Steel having the necessary characteristics for use in the manufacture of antifriction bearings is preferable. The elimination of parts resulting from forming the raceways directly on the crank shaft connecting rods and journals simplifies the structural arrangement of the crank shaft unit thereby reducing the weight thereof to such an extent that the heavy sections of the crank shaft unit are more than compensated for.

I claim—

1. In a crank shaft assembly for internal combustion engines, a ring, a crank shaft having one end journalled in said ring, pinions rotatably carried by said ring, a gear on said shaft having its teeth meshed with the teeth of said pinions, a cam carrier rotatably mounted on the shaft coaxial therewith and internal gear teeth on said carrier in mesh with the teeth of said pinions.

2. In a crank shaft assembly for internal combustion engines, a ring, a crank shaft having one end journalled in said ring, a cam carrier rotatably mounted on the shaft coaxial therewith, and coacting means on the crank shaft ring and carrier whereby rotation of the shaft causes rotation of the cam carrier relative thereto.

3. A crank shaft assembly for internal combustion engines, comprising a crank shaft, one piece bearings operatively associated with said shaft, said bearings being adapted to be mounted in the crank case of an engine, one piece connectiong rods operatively associated with said shaft and a cam carrier rotatably mounted on said shaft.

4. A crank shaft assembly for internal combustion engines, comprising a crank shaft, one piece bearings operatively associated with said shaft, said bearings being adapted to be mounted in the crank case of an engine, a cam carrier rotatably mounted on the crank shaft and coacting means in the crank shaft, cam carrier and one of said bearings whereby rotation of the shaft causes rotation of the cam carrier relative thereto.

5. A crank shaft assembly for internal combustion engines, comprising a crank shaft, one piece bearings operatively associated with said shaft, said bearings being adapted to be mounted in the crank case of an engine, one piece connecting rods operatively associated with the crank pins of said crank shaft, a cam carrier rotatably mounted on said shaft and coacting means on the crank shaft, cam carrier and one of said bearings whereby rotation of the shaft causes relative rotation of the cam carrier.

6. A crank shaft assembly for internal combustion engines, comprising one piece bearings adapted to be mounted in the crank case of the engine, an integral crank shaft journalled in said bearings on antifriction members, one piece connecting rods journalled on the crank pins of said shaft on antifriction members, a cam carrier rotatably mounted on said shaft on antifriction members, said antifriction members serving to lock the bearings, connecting rods and cam carrier in their assembled relation on the crank shaft, and coacting means on said cam carrier crank shaft and one of said bearings whereby rotation of the crank shaft produces relative rotation of the cam carrier.

7. In a crank shaft assembly for internal combustion engines, bearings adapted to be mounted in the crank case, a crank shaft permanently journalled in said bearings, connecting rods permanently associated with the crank pins of the shaft, and a cam carrier permanently journalled on said shaft.

8. In a crank shaft assembly for internal combustion engines, one piece bearings adapted to be mounted in a crank case, a crank shaft journalled in said bearings, one piece connecting rods journalled on the crank pins of said shaft, a one piece cam carrier rotatably mounted on said shaft, and coacting means on said shaft, cam carrier and one of said bearings whereby rotation of the shaft in said bearing causes relative rotation of said cam carrier.

HUGH M. ROCKWELL.